June 2, 1964    A. THAON DE SAINT-ANDRÉ    3,135,399
SELF-SERVICE MOTOR PARKING INSTALLATION
Filed Oct. 10, 1961    3 Sheets-Sheet 1
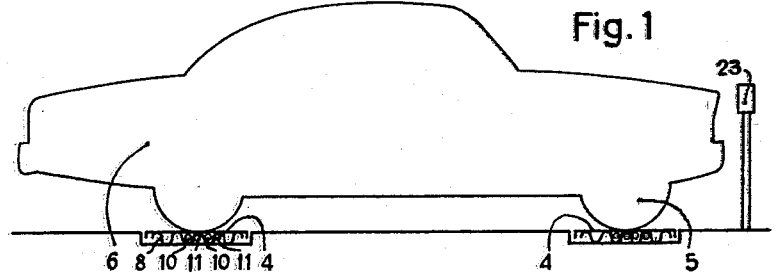
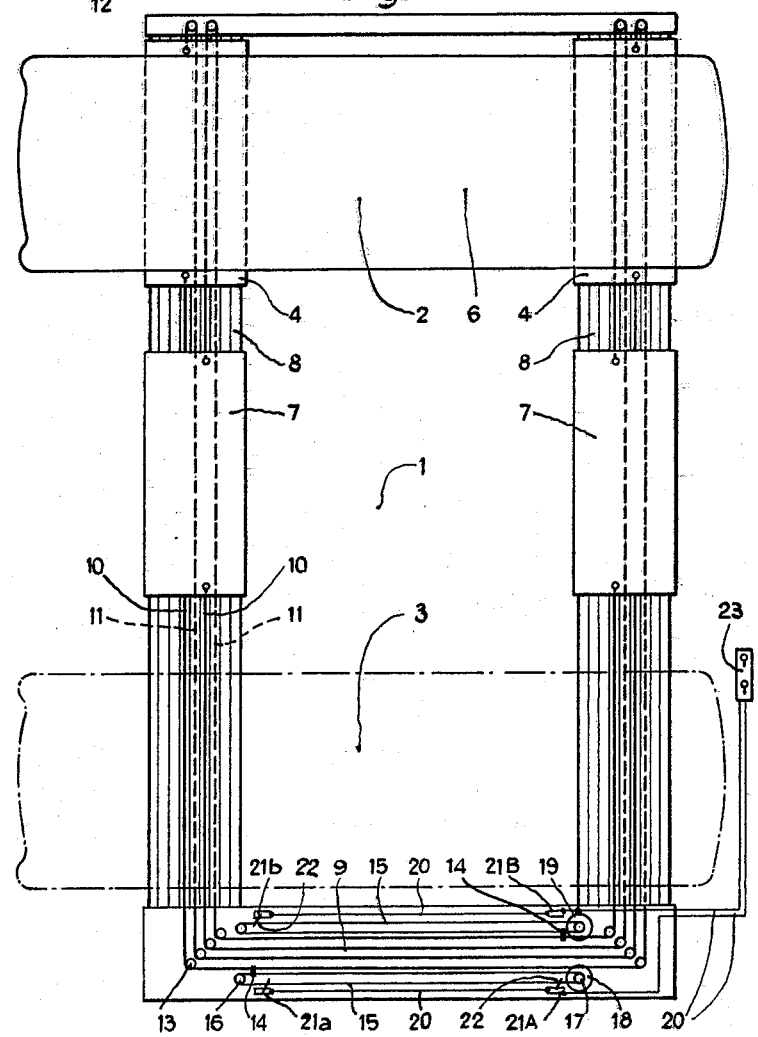
André Thaon De Saint-André,
Inventor
By Wenderoth, Lind and Ponack
Attorneys June 2, 1964     A. THAON DE SAINT-ANDRÉ     3,135,399
SELF-SERVICE MOTOR PARKING INSTALLATION
Filed Oct. 10, 1961     3 Sheets-Sheet 2

United States Patent Office 3,135,399
Patented June 2, 1964

3,135,399
SELF-SERVICE MOTOR PARKING INSTALLATION
André Thaon de Saint-André, "Pré Choisi," Ave. Bosquet-de-Julie, Clarens, Vaud, Switzerland
Filed Oct. 10, 1961, Ser. No. 144,214
Claims priority, application Switzerland Nov. 10, 1960
1 Claim. (Cl. 214—16.1)

The invention relates to garages having mechanical means for the placing and the withdrawal of cars, and more exactly those wherein each car is transported sideways by means of movable platforms to the number of one, two or four, with each supporting four, two or one wheel of the car during the whole duration of transport and of parking.

In such a case, the car generally runs on one track comprising on each side parking sites placed facing each other two by two, stops on a set of movable platforms (that is to say the total number of the movable platforms supporting a car) between two facing sites and is transported on to one of the latter by means of this set of platforms. However, if no set of platforms is on the running track of the car, one must previously be brought thereto so that the car may come thereon, and this results in loss of time which the present invention aims to avoid.

The parking installation according to the invention includes a running track, at least two parking sites placed facing each other on each side of the running track and able each one to receive a car disposed parallel to the said track, a set of movable platforms per parking site for the lateral transport of a car from the running track to this parking site and inversely, each movable platform supporting at least one and at the most four wheels of the car, and means for controlling the movements of this set of movable platforms, and it is characterized in that each couple of parking sites placed facing each other comprises, in combination with the said means for controlling the movements of the movable platforms, a selecting device ensuring that the two sets of movable platforms are moved together as long as one only of these sets supports a car and only one at a time as soon as each set supports a car.

By way of example, there is described hereafter a few embodiments of the installation, referring to the accompanying drawings.

FIGS. 1 and 2 show respectively in profile and in plan one installation of the invention.

Figure 3:
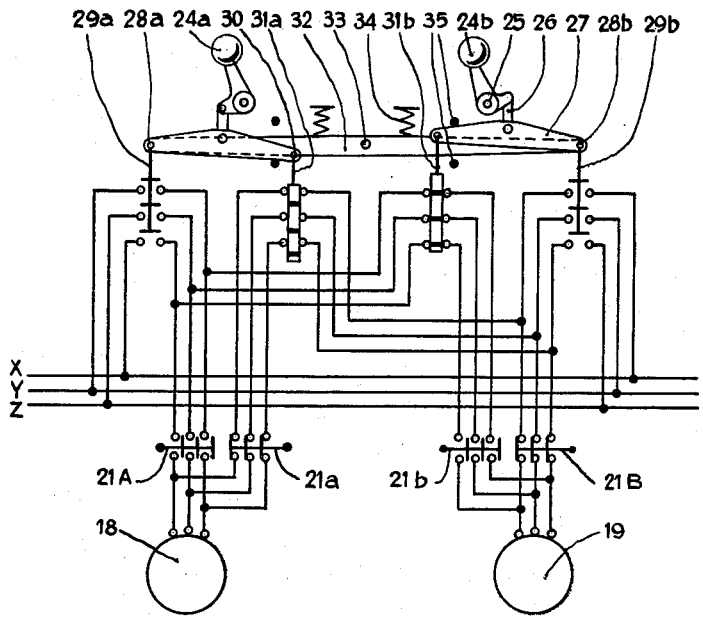
FIGS. 3, 4 and 5 show electrical diagrams according to the invention, respectively, with two electric motors which may work simultaneously, with two motors of which only one works at a time, and with a single motor.

According to FIGS. 1 and 2 the installation comprises a running track 1 disposed between parking sites 2 placed on the left for the car drivers and similar sites 3 placed on the right. A set of platforms 4 supporting the wheels 5 of a car 6 to the number of one platform per axle may be moved from the track 1 to the site 2 and inversely, and an identical set of platforms 7 may be moved from the track 1 to the site 3 (on which the car is indicated in dot and dash lines) and inversely.

The platforms may be made in various ways, comprise live rollers or, on the contrary, comprise runways supported by fixed rollers, etc. In the examples which follow, preference has been given to sliding platforms, each platform 4 or 7 being constituted by a thin flat plate which slides on a corrugated plate 8 set on the ground, and the corrugation having for purpose to prevent the sticking which grease, rust, mud, etc. could produce between two flat plates, and to allow dust, fine gravel, snow, etc. to settle while awaiting the periodical cleaning.

Furthermore, the corrugation of the plate 8 facilitates the drive of the platforms 4 and 7 by means of cables 9 of which the strands 10 secured to the platforms pass in the folds forming channels and of which the strands 11 sent back by the pulleys 12 pass under the folds forming tunnels.

The cables 9 pass over right angle directing pulleys 13 so as to connect the two platforms of a same set and ensure the sameness of the movements between these platforms. They are secured at points 14 to endless roller chains 15 passing over return wheels 16 and over driving toothed wheels 17 driven by electric motors 18 for the drive of the set of platforms 4, and 19 for that of the set of platforms 7. The electric motors 18 and 19 are connected by electric cables 20 to end of travel switches 21 actuated by dogs 22 carried by the chains 15, and to a common control case 23 which shelters the selecting device.

Let us now suppose that the sites 2 and 3 of FIG. 2 are empty, the set of platforms of the last evacuated site having remained normally on the track 1. A car arrives, and stops on this set. The driver steps out, proceeds to the control case 23 and controls the transfer of his car on to the last evacuated site. The platforms are then all on sites, one set being loaded and the other being empty. If another client arrives, he will have to stop before the place where the platforms are moving at the risk of preventing the entrance or the exit of other cars, step out, control the transfer of the set of empty platforms on to the running track, step into his car again, go forward, stop on the set of platforms, set out again and finally control the parking of his car. One will readily see the advantage in moving the set of empty platforms at the same time as the set of loaded platforms during the parking of the first car since the second client then finds the set of platforms in receiving position.

In the diagrams of FIGS. 3 to 6 one will allocate signs $a$ or A to the members relative to the left-hand site 2 and signs $b$ or B relative to the right-hand site 3. According to the electrical diagram of FIG. 3, the selecting device comprises two handles 24, that is to say 24$a$ and 24$b$ each of which controls as follows the transfer of the set of corresponding platforms, in the direction in which it is pushed. Each handle 24 is mounted on a spindle 25 and is connected by a small rod 26 to the centre of a rocking lever 27 one end 28 of which controls a triple pole contactor 29 with separated contacts at rest and the other end 30 controls a triple pole switch 31 with rubbing studs. The ends 28$a$ and 28$b$ are hinged to the ends of a bar 32 mounted to oscillate on a spindle 33 and urged into a horizontal position by springs 34 the strength of which is greater than the friction of a contactor 31. Thus the operation of a handle 24 has for effect to actuate the corresponding switch 31 until it brings it into contact with a stop 35 and then one of the contactors 29 according to the direction of this operation.

The contactors 29$a$ and 29$b$ receive the three phase current distributed by common conductors X, Y, Z and are on the other hand connected respectively to the end of admission travel switches 21A and 21B and respectively to the switches 31b and 31a of opposite signs, the latter being connected on the other hand respectively to the end of exit travel switches 21b and 21a of the same signs as the latter. Finally the end of travel switches 21A and 21a are connected to the motor 18 (site 2, to the left) and the end of travel switches 21B and 21b with the motor 19 (site 3, to the right).

The various stages of operation are explained by the following table in which the letters I and O designate the two positions of each handle: entrance and exit, the signs = and / designate the passage of the current in a switch and the cutting off thereof, and the letters C and U designate the condition of the platforms: loaded or empty, the respective levels of these letters recalling the condition of the platforms according to FIG. 2. Each column of signs corresponds to the end of an operation.

|  |  | 1 | 2 | 3 | 4 | 5 |
|---|---|---|---|---|---|---|
| Handles | 24a | O | I | I | O | O |
|  | 24b | O | O | I | I | O |
| Switches | 31a | = | / | / | = | = |
|  | 31b | = | = | / | / | = |
| Platforms | 4 L |  | U | C | C | U |
|  | 7 R | U |  |  | C | U |

One supposes, at the beginning (column 1), that the sites are empty, the disposition of the two letters U indicating that the last evacuated site was the one on the left. The entrance of a first car is effected by pushing the handle 24a to the left. The fact of pushing the handle 24b to the right would give no result since the end of travel switches 21a and 21B prohibit any movement to the right. By pushing the handle 24a to the left the switch 31a is first of all brought into the position shown in the diagram of FIG. 3. Then the contactor 29a is actuated in its turn and gives the current the passage towards the motor 18 and, by passing through the switch 31b, towards the motor 19. The two sets of platforms then move simultaneously, the force on the handle 24a being maintained failing which the current would be cut off by the contactor 29a pulled back by one of the springs 34. When the correct travel has been effected, the switches 21A and 21b break the current and, noticing the ceasing of the movement, the client releases the handle 24a and goes away. The general situation is then that which corresponds to column 2 and FIGS. 2 to 6.

For the following entrance into the right-hand site (column 3), the client pushes the handle 24b to the right, which has for effect to cut off the passage through the switch 31b while the passage through the switch 31a has already previously been cut off. Thus the current reaches the motor 19 by the contactor 29b, the arrival to the motor 18 being forbidden both by the switch 31a and by the switch 31b without the cutting off of which the current would pass as soon as the switches 21b and 21A are no longer open. The set of platforms 7 is thus alone transferred and the two cars are then parked.

The above table accounts for the two entrances already described and two exits bringing the installation back to its original condition save that the supposed order for the exits brings the sets of platforms towards the left, the last evacuated site being the one on the right.

All other successions of movements comprise the same elementary stages as those thus schematized and it will readily be observed that the selecting device thus constituted correctly fulfills the desired conditions.

Since no more than one set of loaded platforms is ever moved at one time, it may be preferred to operate only one motor at a time by pushing the platforms of one set by means of the platforms of the other, thus assuming that the platforms are lengthened and touch one another when at least one set is empty and that the transmissions between motors and sets of platforms are reversible.

Figure 4:
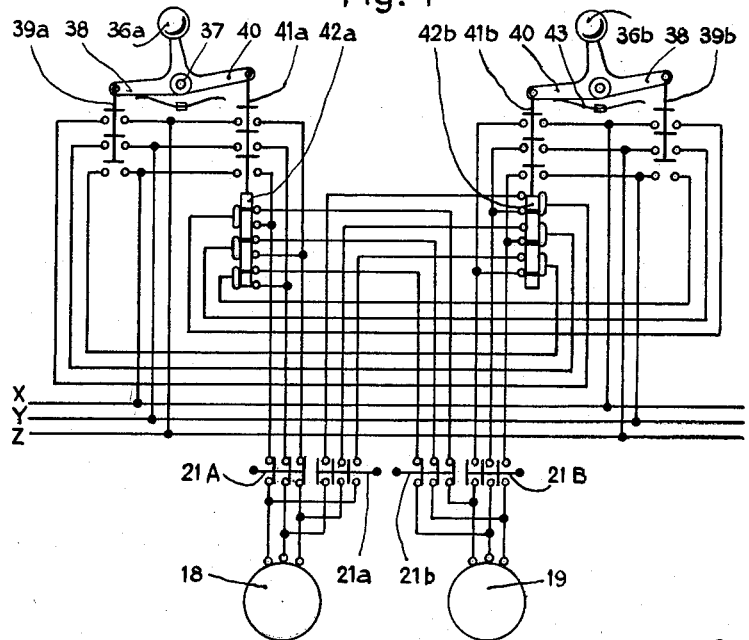

According to the electrical diagram FIG. 4 this variant is carried out as follows. The handles 36 mounted on spindles 37 each comprise an arm 38 which controls a triple pole contactor 39 and an arm 40 which controls at the same time a triple pole contactor 41 and a switch 42 with rubbing studs. The contactors 39 and 41 receive the three phase current distributed by conductors X, Y, Z. The contactor 39a is connected to the switch 42b of opposite sign, through which the current goes either to the end of travel switch 21a if the handle 36b is in the "entrance" position (thrust to the right—switch upwards), or to the end of travel switch 21B if the handle 36b is in the "exit" position (thrust to the left—switch downwards). Inversely, the contactor 39b is connected to the switch 42a and, through the latter, to the end of travel switches 21b or 21A. The contactors 41a and 41b are respectively connected to the end of travel switches 21A and 21B. A spring 43 constituted by a curved blade recalls each handle 36 in such a way that when the operator releases it, the contacts of the contactors 39 and 41 are separated while the commutations of the switches 42 are maintained.

Under these conditions, a handle pushed in the direction of the entrance controls the corresponding set of platforms if the opposite site is occupied and the opposite set of platforms if the opposite site is empty. A handle pushed in the direction of the exit always controls the corresponding set of platforms, which corresponds indeed to the propounded conditions.

Figure 5:
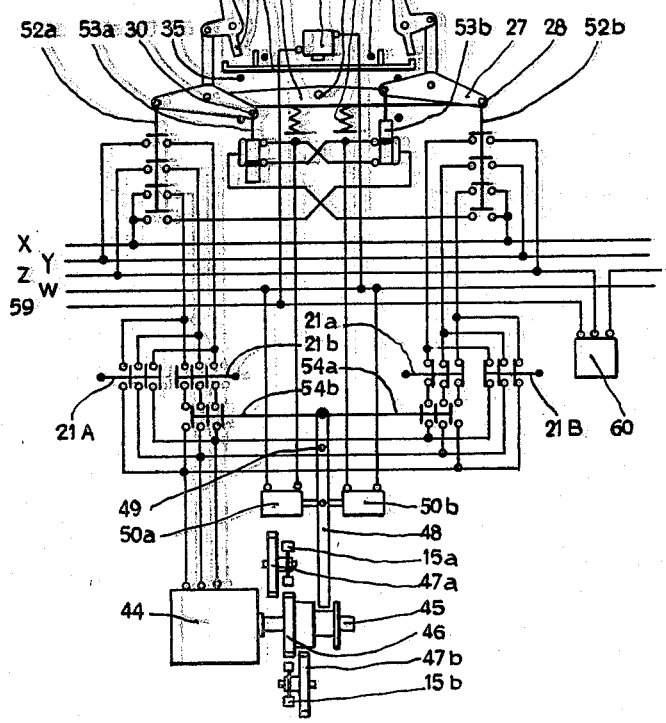

According to a third electrical diagram shown in FIG. 5, a single motor 44 controls the movements of the two sets of platforms, which implies, as in the preceding example, that the two platforms are lengthened and touch one another when at least one set is empty. The driving shaft 45 is fluted and carries a sliding pinion 46 which may gear either with a pinion 47a driving the chain 15a, or with a pinion 47b driving the chain 15b. The axial sliding of the sliding pinion 46 is controlled by an arm 48 hinged to a pivot 49 and actuated in one direction or the other respectively by electro-magnets 50a and 50b.

The control members are similar to those of the diagram FIG. 3, that is to say two handles 51 actuating rocking levers 27 connected by a bar 32 mounted to oscillate on a spindle 33 and urged into a horizontal position by springs 34. The end 28 of each rocking lever 27 controls a four pole contactor 52 with separated contacts at rest and the other end 30 controls a single pole switch 53 the travel of which is restricted by stops 35. The contactors 52 receive the three phase current distributed by conductors X, Y, Z. The contactor 52a is connected to the leftward end of travel switches 21A for the left-hand platforms and 21b for the right-hand platforms. Similarly, the contactor 52b is connected to the rightwise end of travel switches 21a for the left-hand platforms and 21B for the right-hand platforms. The fourth pole of the contactors 52 transmits the current of the conductor X to the switch 53 of opposite sign, the latter being connected to the electro-magnet 50 of the same sign. The electro-magnets 50 are on the other hand connected to a neutral common conductor W. In addition to the control of the sliding pinion 46, the arm 48 controls two switches 54a and 54b respectively mounted in series with the end of travel switches 21a and 21b of the same signs. Finally, the end of travel switches 21A and 21B and the switches 54a and 54b are connected to the motor 44.

The various stages of operation are explained by the following table for which one has adopted the same conventional signs as previously. It is further understood that:

The letters C and D for the sliding pinion 46 (in brief slider) indicate respectively the sliding to the left and to the right and, correlatively, the drive of the left-hand and right-hand platforms, The signs relative to the contactors 52, to the slider 46 and to the switches 54 concern the positions during the transfer controlled by the position of the handles 51, The signs relative to the end of travel switches 21 and to the platforms concern their positions at the end of this same transfer.

|  |  | 1 | 2 | 3 | 4 | 5 |
|---|---|---|---|---|---|---|
| Handles | 51a | S | E | E | S | S |
|  | 51b | S | S | E | E | S |
| Contactors | 52a |  | = | = | = | = |
|  | 52b |  | / | = | / | / |
| Slider | 46 |  | D | D | G | D |
| Switches | 54b |  | = | = | = | = |
|  | 54a |  | / | / | / | / |
| End of travel switches | 21A | = | / | = | = | / |
|  | 21b | = | = | = | / | = |
|  | 21a | / | = | = | / | = |
|  | 21B | / |   |   | / | V |
|  |  |   | C | C |   |   |
| Platforms | G4 | V | V |   | V | V |
|  | D7 | V |   | C | C |   |

Starting, as previously, from the original position (column 1, empty sites), the entrance of a first car is effected by pushing the handle 51 to the left (column 2) which has for effect to feed the motor 44 through the contactor 52 and, simultaneously, to gear the sliding pinion 46 with the right-hand pinion 47b and give passage for the current in the switch 54b. The right-hand empty platforms push the left-hand loaded platforms and this until the breaking of the current simultaneously by the end of travel switches 21A and 21b mounted in parallel.

For the following entrance, the handle 51b is pushed to the right (column 3) which has for effect to feed the motor 44 through the contactor 52b and, simultaneously, to gear again the sliding pinion 46 with the right-hand pinion 47b. The right-hand platforms are thus alone driven and the stopping is effected by the single end of travel switch 21B since the switch 54 is cut off. For the exit of a car, for example the one on the left, the handle 51a is pushed to the right (column 4) which has for effect to actuate the contactor 52b and, simultaneously, to gear the sliding pinion 46 with the left-hand pinion 47a and to give passage for the current in the switch 54a in order to feed the motor 44. This time, it will be the end of travel switch 21a which will stop the motor since the end of travel switch 21B has remained open at the end of the previous operation.

Each handle 51 is provided with a lower dog 55 which may catch an end of a bar 56 guided vertically by stops 57 and subjected to the action of an electro-magnet 58 connected to the neutral conductor W and to a common conductor 59. When this latter is fed, the electro-magnet 58 draws the bar 56 upwards and the latter prevents the rotation of the handles 51 in the direction of the exit. The object of this device is to avoid that too great a number of motors be controlled at a time and that there results too high an intensity in the common conductors. Beyond a certain intensity, a thermic relay 60 feeds the common conductor 59 and any further exit control is forbidden whereas the exits in progress terminate and the entrances remain free to avoid the congestion of the parking.

One has so far given examples of practical applications of the invention in the case where the transfers of the platforms are produced by electro-mechanical means. In fact, selecitng devices obtaining the same results may be worked out for all sources and kinds of energy, for example manual, mechanical, pneumatic, hydraulic.

Figure 6:
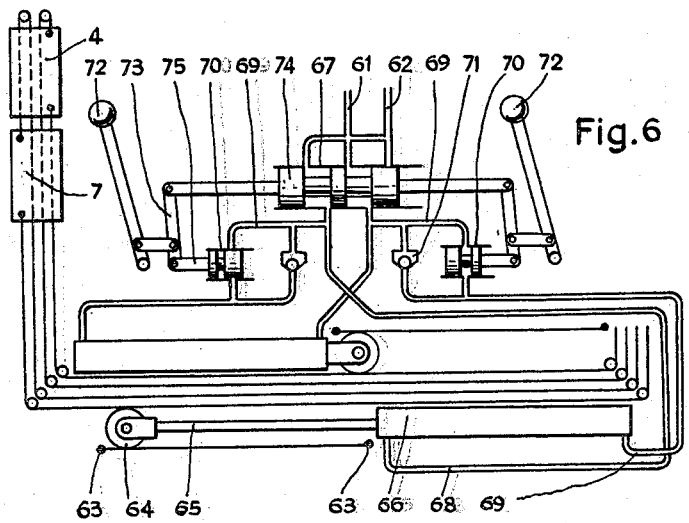
FIG. 6 shows a hydraulic diagram according to the invention.

By way of example, we will further describe, according to the diagram FIG. 6, a general hydraulic control comprising a piping under pressure 61 and a discharge pipe 62. The control of the platforms 4 and 7 (shown, but only for one axle, in order to facilitate the understanding of the diagram) is effected as previously by means of cables but these, instead of being endless, are secured at fixed points 63 after passing over pulleys 64 mounted on the ends of the rods 65 of double-acting hydraulic jacks 66, the whole constituting a classic device for the duplication of the travel of the jacks. A distributor 67 is branched on the pipes 61 and 62 and feeds the jacks 66 in the direction of the entrance by pipes 68, and in the direction of the exit by pipes 69 each comprising a gate-valve 70 and a check-valve 71 mounted in parallel. For each set of platforms, a handle 72 controls at the same time, by means of a rocking lever 73, the slide 74 of the distributor 67 and the piston 75 of the gate-valve 70 of the same sign. When the handle 72 is in the entrance position, it closes the gate-valve 70 of the same sign and the entrance operation of the second handle 72 is without effect on the set of platforms of the opposite sign, while the exit operation puts under pressure the two jacks in the direction of the controlled exit, the piston of the jack of opposite sign having already effected the corresponding travel if the corresponding set of platforms is loaded. This hydraulic selecting device therefore also fulfills the desired conditions.

What I claim is:

A parking installation for motor cars, comprising an invariable and permanent driveway, two files of parking sites disposed opposite each other in fixed relationship on both sides of said driveway, the parking sites being arranged symmetrically with respect to the middle line of said driveway in said files and adapted to receive a car resting in lengthwise direction on said driveway, a set of movable platforms per parking site for the lateral transport of a car from the driveway to a parking site and inversely, each set comprising at least one and at the most four platforms, and at least one motor for the lateral shifting of each set of movable platforms, each couple of parking sites placed opposite each other comprising, in combination with the said motor or motors for the lateral shifting of the platforms, a selecting device acting on said motor or motors and having two manually operatable control means arranged to be shifted by an operator from a waiting position to a parking position and vice-versa, each of said control means controlling the lateral shifting of its corresponding set of platforms from the position in the driveway to the corresponding lateral parking site and vice-versa, said selecting devices also having interconnection means disposed between said two control means for rendering the action of each control means on the other set of platforms dependent on the actual position of the other control means, whereby one set of platforms is shifted together with the laterally adjacent set if the control means of the latter is in waiting position.

References Cited in the file of this patent

UNITED STATES PATENTS

| 1,643,409 | Freeman | Sept. 27, 1927 |
| 1,829,023 | Swartout | Oct. 27, 1931 |
| 2,031,392 | Taylor | Feb. 18, 1936 |
| 2,762,515 | Ingold | Sept. 11, 1956 |